United States Patent
Ioffe et al.

(10) Patent No.: US 12,140,657 B2
(45) Date of Patent: Nov. 12, 2024

(54) DIRECTLY DETERMINING FREE SPACES AROUND DEVICES

(71) Applicant: Aptiv Technologies AG, Schaffhausen (CH)

(72) Inventors: Alexander Ioffe, Bonn (DE); Uri Iurgel, Wuppertal (DE); Dariusz Cieslar, Cracow (PL)

(73) Assignee: Aptiv Technologies AG, Schaffhausen (CH)

( * ) Notice: Subject to any disclaimer, the term of this patent is extended or adjusted under 35 U.S.C. 154(b) by 386 days.

(21) Appl. No.: 17/456,118

(22) Filed: Nov. 22, 2021

(65) Prior Publication Data

US 2022/0163653 A1 May 26, 2022

(30) Foreign Application Priority Data

Nov. 23, 2020 (EP) .................................... 20209230

(51) Int. Cl.
*G01S 13/46* (2006.01)
*G01S 13/931* (2020.01)

(52) U.S. Cl.
CPC ............ *G01S 13/46* (2013.01); *G01S 13/931* (2013.01)

(58) Field of Classification Search
None
See application file for complete search history.

(56) References Cited

U.S. PATENT DOCUMENTS

| | | | |
|---|---|---|---|
| 4,845,500 A * | 7/1989 | Cornett | G01S 7/2927 342/139 |
| 7,639,171 B2 | 12/2009 | Alland et al. | |
| 9,470,777 B2 | 10/2016 | Arage | |
| 10,303,492 B1 | 5/2019 | Wagner et al. | |
| 10,430,641 B2 | 10/2019 | Gao | |
| 11,231,481 B1 * | 1/2022 | Cohen | G01S 7/2927 |
| 11,455,806 B2 * | 9/2022 | Gummadi | G06V 10/7715 |
| 11,537,139 B2 * | 12/2022 | Rankawat | G06N 3/08 |
| 2015/0012204 A1 | 1/2015 | Breuer et al. | |
| 2015/0353083 A1 | 12/2015 | Hasberg et al. | |
| 2016/0116916 A1 | 4/2016 | Pink et al. | |

(Continued)

FOREIGN PATENT DOCUMENTS

| | | |
|---|---|---|
| CN | 103559791 | 2/2014 |
| CN | 111401208 | 7/2020 |

(Continued)

OTHER PUBLICATIONS

"Extended European Search Report", EP Application No. 20209230.0, May 4, 2021, 10 pages.

(Continued)

*Primary Examiner* — Bernarr E Gregory
(74) *Attorney, Agent, or Firm* — Harness, Dickey & Pierce, P.L.C.

(57) ABSTRACT

Provided is method for determining free space surrounding a device, the method comprising: acquiring radar data regarding each of one or more radar antennas, the acquired radar data comprising range data and range rate data; extracting, from the acquired radar data, a specific set of radar data having values equal to or below a noise-based threshold; and determining a free space around the device based on the extracted specific set of radar data.

20 Claims, 9 Drawing Sheets

(56) References Cited

U.S. PATENT DOCUMENTS

| | | | |
|---|---|---|---|
| 2018/0188059 A1 | | 7/2018 | Wheeler et al. |
| 2018/0329034 A1 | | 11/2018 | Bilik et al. |
| 2018/0350086 A1 | | 12/2018 | Sweet et al. |
| 2018/0356508 A1 | * | 12/2018 | Manocha ............... G01S 13/931 |
| 2019/0271549 A1 | | 9/2019 | Zhang et al. |
| 2019/0286153 A1 | | 9/2019 | Rankawat et al. |
| 2019/0324148 A1 | * | 10/2019 | Kim ...................... G01S 17/931 |
| 2019/0340775 A1 | | 11/2019 | Lee et al. |
| 2019/0384302 A1 | | 12/2019 | Silva et al. |
| 2020/0250485 A1 | | 8/2020 | Nagori et al. |
| 2020/0334544 A1 | | 10/2020 | Liu et al. |
| 2020/0356415 A1 | | 11/2020 | Goli |
| 2021/0291816 A1 | | 9/2021 | Lilja et al. |
| 2021/0300353 A1 | | 9/2021 | Carlander et al. |
| 2021/0331679 A1 | | 10/2021 | Lilja et al. |
| 2021/0333380 A1 | | 10/2021 | Lilja et al. |

FOREIGN PATENT DOCUMENTS

| | | | |
|---|---|---|---|
| DE | 102009009047 | | 8/2010 |
| DE | 102009022588 | | 12/2010 |
| DE | 102016007630 | | 12/2017 |
| DE | 102017217972 | | 4/2019 |
| DE | 102017126388 | | 5/2019 |
| DE | 102019205008 | | 7/2020 |
| EP | 3454079 | | 3/2019 |
| JP | 2018138402 | | 9/2018 |
| WO | WO2019/091700 A1 * | 5/2019 | ........... G01S 13/931 |
| WO | 2020140047 | | 7/2020 |

OTHER PUBLICATIONS

"Extended European Search Report", EP Application No. 20211232. 2, May 25, 2021, 10 pages.

"Extended European Search Report", EP Application No. 20214293. 1, May 27, 2021, 10 pages.

"Extended European Search Report", EP Application No. 20164443. 2, Sep. 9, 2020, 10 pages.

"Extended European Search Report", EP Application No. 20171489. 6, Sep. 18, 2020, 11 pages.

"Extended European Search Report", EP Application No. 20171491. 2, Sep. 28, 2020, 9 pages.

"Extended European Search Report", EP Application No. 20166617. 9, Oct. 7, 2020, 7 pages.

Aihara, et al., "Free-Space Estimation for Self-Driving System Using Millimeter Wave Radar and Convolutional Neural Network", Mar. 2019, 4 pages.

Bochkovskiy, et al., "YOLOv4: Optimal Speed and Accuracy of Object Detection", Apr. 23, 2020, 17 pages.

Caltagirone, et al., "LIDAR—Camera Fusion for Road Detection Using Fully Convolutional Neural Networks", Sep. 21, 2018, 7 pages.

Casapietra, et al., "Building a Probabilistic Grid-based Road Representation from Direct and Indirect Visual Cues", Jun. 2015, 8 pages.

Chen, et al., "Progressive LiDAR Adaptation for Road Detection", Apr. 2, 2019, 11 pages.

Foroughi, et al., "Free Space Grid for Automotive Radar Sensors", Sep. 2015, pp. 249-256.

Godard, et al., "Digging Into Self-Supervised Monocular Depth Estimation", Aug. 17, 2019, 18 pages.

Guizilini, et al., "3D Packing for Self-Supervised Monocular Depth Estimation", Mar. 28, 2020, 13 pages.

Kunz, et al., "Fast Collision Checking with a Frenet Obstacle Grid for Motion Planning", Jun. 2014, pp. 95-104.

Li, et al., "High Resolution Radar-based Occupancy Grid Mapping and Free Space Detection", Mar. 2018, pp. 70-81.

Liang, et al., "PolyTransform: Deep Polygon Transformer for Instance Segmentation", Jan. 16, 2021, 10 pages.

Lyu, et al., "ChipNet: Real-Time LiDAR Processing for Drivable Region Segmentation on an FPGA", Mar. 5, 2019, 11 pages.

Maneewongvatana, et al., "It's okay to be skinny, if your friends are fat", Dec. 18, 1999, 8 pages.

Nuss, "Consistent Environmental Modeling by use of Occupancy Grid Maps, Digital Road Maps, and Multi-Object Tracking", Jun. 2014, 7 pages.

Redmon, et al., "YOLO9000: Better, Faster, Stronger", Jul. 2017, 9 pages.

Redmon, "YOLOv3: An Incremental Improvement", Apr. 8, 2018, 6 pages.

Redmon, et al., "You Only Look Once: Unified, Real-Time Object Detection", May 9, 2016, 10 pages.

Sundram, et al., "Development of a Miniature Robot for Multi-robot Occupancy Grid Mapping", Jul. 2018, 7 pages.

Suzuki, et al., "Topological Structural Analysis of Digitized Binary Images by Border Following", Apr. 1985, pp. 32-46.

Weiss, "Robust Driving Path Detection in Urban and Highway Scenarios Using a Laser Scanner and Online Occupancy Grids", Jul. 2007, pp. 184-189.

Zhao, et al., "Pyramid Scene Parsing Network", Apr. 27, 2017, 11 pages.

Zou, "Free Space Detection Based on Occupancy Gridmaps", Apr. 2012, 70 pages.

* cited by examiner

DIRECTLY DETERMINING FREE SPACES AROUND DEVICES

CROSS-REFERENCE TO RELATED APPLICATION

This application claims priority to European Patent Application Number 20209230.0, filed Nov. 23, 2020, the disclosure of which is hereby incorporated by reference in its entirety herein.

BACKGROUND

Determining that the area surrounding a vehicle is free of any obstacles with which the vehicle may collide, may be a crucial capability for automation driving.

Driver assistance systems, which render possible semi-autonomous or autonomous driving, must be able to access accurate information about the driving environment of a vehicle. In particular, in the vehicle surroundings, driver assistance systems should distinguish between passable, drivable, or open areas (free space) and impassable areas.

Modern vehicles typically have, among other sensors such as ultrasound sensors, camera sensors and lidar sensors, one or more radar sensors which can be used for detecting obstacles. An occupancy grid may be obtained by using radar sensors. For this purpose, the driving environment of the vehicle can be represented as a typically two-dimensional grid structure, wherein each cell of the grid structure may be assigned an occupancy value. The occupancy value can be a binary value which has the values "free" and "occupied". Ternary values can likewise be used, making it additionally possible for a cell to be assigned the value "unknown".

In particular, for some systems, it may be useful to introduce a probabilistic occupancy grid and a probabilistic free space grid separately, where (for every grid cell) the probability of a cell being "occupied" in the occupancy grid and a corresponding cell being "free" in the free space grid do not sum to 100%, and it is therefore proposed to have a "occupied" state, a "free" state, and an "unknown" state. Given the finite reliability of radar measurements, for example, with regard to low reflection objects, a technical classification of a cell being "occupied" and "free" are thus not necessarily complementary information, and hence the indirect derivation of the free space information (based on measuring actual detection of obstacles) may be of limited reliability.

Another indirect method may include accumulating detections in an "occupancy grid", and an assumption is made that the empty spaces are free.

Still in other examples, free space information is estimated by making the aforementioned indirect measurement assumptions, and "covering" the difference between Radar free space and Lidar free space by training a Neural Network. The training of Neural Networks requires, however, significant efforts, which have to be repeated or adapted for new radar models and the implementation is not easy. Using machine learning using radar sensors may also require large labelled data sets to prove an appropriate performance.

SUMMARY

Technical Problem

The present disclosure relates to a device, a method, and a computer program for directly determining a free space surrounding the device. The device may be provided in a vehicle so that the free space is determined as a free space for the vehicle.

An indirect derivation of free space information from radar sensors is bound to certain requirements. In particular, actual detections (i.e. actual reflections from an obstacle) are required to determine a free space, which is assumed as space between the radar and the site where a detection (reflection) has occurred. This requirement limits accuracy of the indirect free space derivation because detections (i.e. reflections from an obstacle) may be sparse and because this method using indirect derivation of free space typically relies on strong targets (e.g. strong reflection energy).

Regarding the determination of a "strong target", there is also a problem of classifying a detection (reflection) as "strong", i.e. indicating an obstacle. The determination of an adequate filtering method and/or threshold suitable for reliably detecting actual (i.e. strong or weak) targets requires careful tuning of the equipment and parameters by, for example, trial and error. After all, the strength of the reflection from a target depends on material, shape and position of the obstacle. This dependency combined with the broad spectrum of possible obstacles makes the choice of a filtering method and/or threshold difficult and always entails a tradeoff between over-detection (including false positives) and under-detection (including false negatives).

Further, using a value that indicates the confidence of the determination of free space (e.g. using a state of "free", "occupied" and "unknown", and in some cases in combination with a probabilistic value) entails the issue of falsely identifying free space, risking an accident with the vehicle, or falsely identifying occupied space, limiting mobility of the vehicle.

There is thus a need to overcome the technical limitations of indirectly deriving free space information from radars.

Solution

The described techniques, including the below described embodiments and the following, solve the above-identified technical problems. Thereby free space information surrounding a device and thus also of a vehicle can be directly determined.

According to a first aspect, a method for directly determining free space surrounding a device includes: acquiring radar data regarding each of one or more radar antennas, the acquired radar data comprising range data and range rate data; extracting, from the acquired radar data, a specific set of radar data having values equal to or below a noise-based threshold; determining a free space around the device based on the extracted specific set of radar data.

According to a second aspect, the acquired radar data is constituted by values, each value being a detection value indicating an amplitude of a radar return signal for a combination of the range data and the range rate data; and the specific set of radar data is constituted by detection values of the acquired radar data that are equal to or below the noise-based threshold.

According to a third aspect the noise-based threshold is based on a measured noise level of the device.

According to a fourth aspect the noise-based threshold is based on a constant false alarm rate, CFAR, a signal to noise ratio, SNR, and/or a peak to average power ratio, PAPR.

According to a fifth aspect the noise-based threshold is a radar antenna specific noise-based threshold.

According to a sixth aspect the noise-based threshold is a threshold set by a machine-learned algorithm.

According to a seventh aspect a free space angle θ of the device is computed based on the extracted range rate data and combined with the extracted range data to produce polar coordinates used for determining coordinates of the free space.

According to an eighth aspect the free space angle θ is computed based on the expression:

$$\dot{r} = \begin{pmatrix} \cos(\theta) \\ \sin(\theta) \end{pmatrix} \cdot \left[ -\begin{pmatrix} v_x \\ v_y \end{pmatrix} \right]$$

wherein $\dot{r}$ is the range rate, $v_x$ is an x-component of a speed of the device, and $v_y$ is a y-component of the speed of the device.

According to a ninth aspect the determination translates the determined free space relative to a position of the device.

According to a tenth aspect, the method further includes: removing side lobes, which may use an approach based on an iterative adaptive approach (IAA) algorithm or a computational algorithm, such as a CLEAN algorithm.

According to an eleventh aspect a computer program includes instructions which, when the program is executed by a computer, cause the computer to carry out the method according to the first to tenth aspect.

According to an twelfth aspect a device for directly determining free space surrounding the device includes: an acquisition unit configured to acquire radar data regarding each of one or more radar antennas, the acquired radar data comprising range data and range rate data; an extraction unit configured to extract, from the acquired radar data, a specific set of radar data having values equal to or below a noised-based threshold; and a determination unit configured to determine a free space around the device based on the extracted specific set of radar data.

According to a thirteenth aspect the device further includes one or more radar antennas.

According to a fourteenth aspect the one or more radar antennas is/are configured to emit a radar signal and detect a return signal; and the acquisition unit is configured to acquire the acquired radar data based on the radar return signal.

According to a fifteenth aspect a vehicle has a device according to any one of the twelfth to fourteenth aspects.

More specifically, the present disclosure relates to a method, program, and device for determining free space surrounding a device using any of the aspects described above or below, alone or in any combination. Rather than detecting targets and then (indirectly) deriving free space from the detected targets, the described techniques utilize a noise-based threshold to extract from the acquired radar data, a specific set of radar data, which is used for directly determining free space around the device.

The usage of this noise-based threshold does not depend on the possible strength of a reflection from a target (which directly depends on material, shape, and position of the obstacle). Instead, a physical property of the device itself, which is not dependent on the target's properties (e.g. outside and/or inside noise), may be used to determine the noise-based threshold. Unlike the strengths of reflections from targets, this physical property remains (comparatively) constant, allowing a more objective determination of the noise-based threshold. Because the used noise-based threshold is no longer sensitive to differences in reflections from different kinds of obstacles, the accuracy and certainty of detecting free space are improved.

DESCRIPTION OF EMBODIMENTS

Embodiments of the present disclosure will now be described in reference to the enclosed figures. In the following detailed description, numerous specific details are set forth. These specific details are only to provide a thorough understanding of the various described embodiments. Further, although the terms first, second, etc. may be used to describe various elements, these elements should not be limited by these terms. These terms are only used to distinguish one element from another.

According to the concept of the present disclosure, a free space environment around a device (around a vehicle) is not indirectly determined using actual detections of radar signals reflected from an obstacle but directly using information about free areas. The described techniques provide an easy and fast methodology which does not require training of Neural Networks and provides a more accurate determination of the free space.

Figure 1:
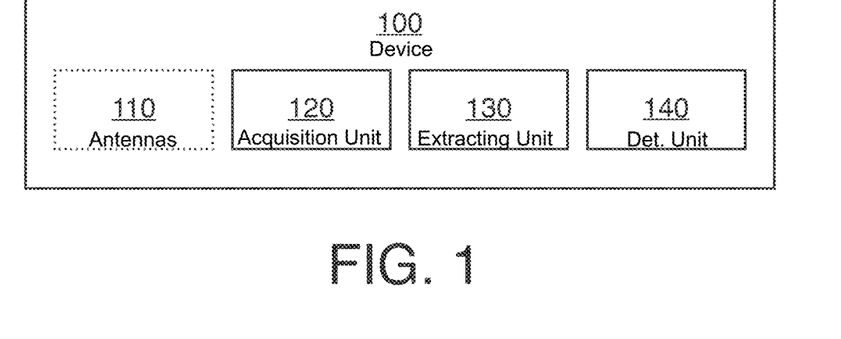
FIG. 1 shows a device according to an embodiment of the present disclosure.
Figure 2:
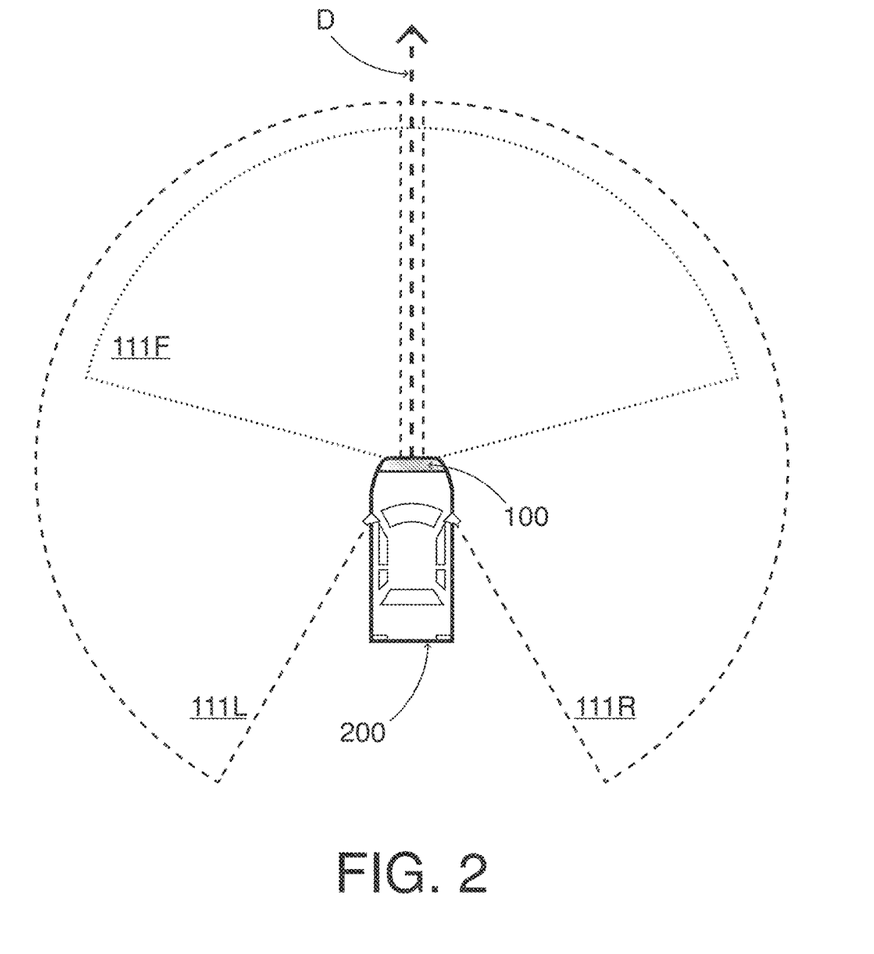
FIG. 2 shows a device according to an embodiment of the present disclosure for determining free space surrounding a device.

FIG. 1 shows a device 100 according to an embodiment of the present disclosure for determining free space surrounding the device 100. The device 100 may be provided to a vehicle 200 as shown in FIG. 2 and may be mounted on the vehicle 200 facing a driving direction of the vehicle. The skilled person understands that it is not required that the device 100 faces the driving direction; the device 100 can also face to a side direction or to a rear direction. The device 100 may be a radar sensor, a radar module, part of a radar system or the like. Based on the direct determination of free space (as detailed below), a free space surrounding the vehicle 200 can be determined.

A vehicle 200 may be any land vehicle that is moved by machine power. Such a vehicle 200 may also be tied to railroad tracks, floating, diving or airborne. The figures exemplify this vehicle 200 as a car, with which the device 100 is provided. The present disclosure is, however, not limited thereto. Hence, the device 100 may also be mounted to e.g. a lorry, a truck, a farming vehicle, a motorbike, a train, a bus, an aircraft, a drone, a boat, a ship, or the like.

The device 100 may have a plurality of detection areas, for example be orientated such that it has a forward detection area 111, a left detection area 111L and/or a right detection area 111R as shown in FIG. 2. In addition, an extension of the detection areas (such as a near field detection area, far field detection area) may differ.

As illustrated in FIG. 1, the device 100 includes an acquisition unit 120, an extracting unit 130 and a determination unit 140, and may additionally include one or more antennas 110, but the one or more antennas may also be provided separate to the device 100.

The one or more antennas 110 may be radar antennas. Herein, the one or more antennas 110 may be configured to emit radar signals, which may be modulated radar signals, e.g. a Chirp-Signal. A signal may be acquired or detected at the one or more antennas 110 and is generally referred to as return signal below. Herein, the return signal(s) may result from a reflection of the emitted radar signal(s) on an obstacle but may also include a noise signal resulting from noise which may be caused by other electronic devices, other sources of electromagnetic interference, thermal noise, and the like.

The one or more antennas may be provided individually or as an array of antennas, wherein at least one antenna of the one or more antennas 110 emits the radar signal(s), and at least one antenna of the one or more antennas 110 detects the return signal(s). The detected or acquired return signal(s) represents a variation of an amplitude/energy of an electromagnetic field over time.

The acquisition unit 120 is configured to acquire radar data regarding each of the one or more radar antennas 110, the acquired radar data include range data and range rate data. The acquisition unit 120 may acquire the return signal, detected at the one or more antennas, and may apply an analogue-to-digital (A/D) conversion thereto. The acquisition unit 120 may convert a delay between emitting the radar signal(s) and detecting the return signal(s) into the range data. The delay, and thereby the range data, may be acquired by correlating the return signal(s) with the emitted radar signal(s). The acquisition unit 120 may compute, from a frequency shift or a phase shift of the detected return signal(s) compared to the emitted radar signal(s), a doppler shift or a range-rate shift as the range rate data. The frequency shift or the phase shift, and thereby the range rate-data, may be acquired by frequency-transforming the return signal(s) and comparing its frequency spectrum with the frequency of the emitted radar signal(s). The determination of range data and range-rate/Doppler data from the detected return signal(s) at the one or more antennas may, for example, be performed as described in U.S. Pat. No. 7,639,171 or 9,470,777 or EP 3 454 079.

Figure 3:
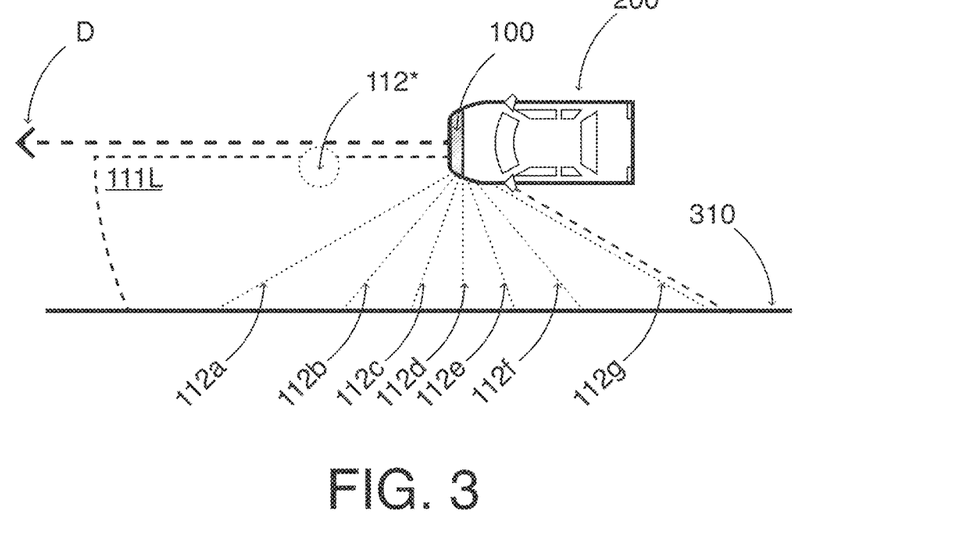
FIG. 3 shows a device according to an embodiment when determining free space surrounding a device

FIG. 3 shows a vehicle 200 driving in a direction D parallel to an obstacle 310, e.g. a guardrail alongside a road. For simplicity, only the left detection area 111L is illustrated in FIG. 3. For the left detection area 111L, for each of the one or more antennas 110, the acquisition unit 120 may acquire radar data similar to that shown in FIG. 4.

Figure 4:
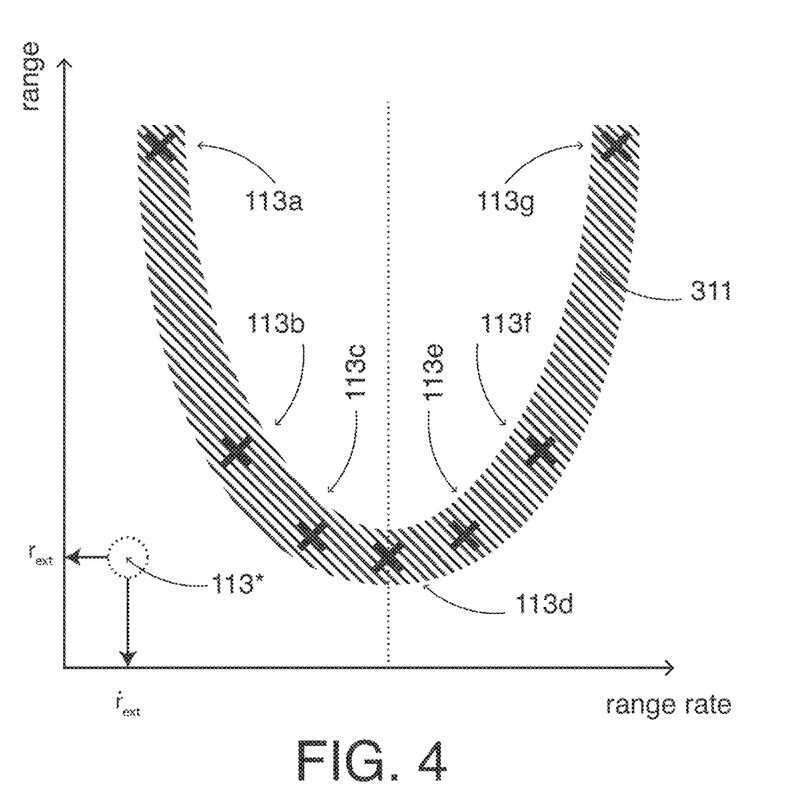
FIG. 4 shows radar data according to an embodiment when determining free space surrounding a device.

In FIG. 4, the vertical axis schematically illustrates a range from the vehicle 200 (e.g. determined by use of the delay mentioned above) and may be measured in meters. In FIG. 4, the horizontal axis illustrates a range rate relative to the vehicle 200 (e.g. determined by use of the doppler shift or the range-rate shift mentioned above) and may be measured in meters per second. In FIG. 4, the dotted vertical line illustrates no speed relative to the vehicle 200 (doppler shift or range-rate shift). In FIG. 4, the crosses 113 (i.e. 113a, . . . 113g) illustrate information of the radar data related to the obstacle 310 as detected along dotted lines 112 (i.e. 112a, . . . 112g) shown in FIG. 3 within the left detection area 111L. In FIG. 4, the shaded area 311 illustrates information of the radar data related to the obstacle 310 and may be determined based on the entire radar data, i.e. not only based on the crosses 113. In other words, the shaded area may be determined, for example, when applying a higher resolution, e.g. by increasing the number bins or slots (leading to an increase of the number of crosses 113) above the number of crosses 113 shown in FIG. 4. Since this increase would lead to more crosses 113, they are omitted in the illustration and, instead, indicated by the shaded area 311.

More specifically, with regard to the example of FIGS. 3 and 4, each cross 113 in FIG. 4 illustrates a detection associated to a bin or slot associated to a range and a range-rate. E.g. the radar signal may radially propagate from the device 100 and may be (partially) reflected from the obstacle 310 after some time. Some of the radar signal that may travel along line 112a, may take longer to return than some of the radar signal traveling along line 112d. Therefore, a reflection of the radar signal along line 112a may result in a longer delay than a reflection of the radar signal traveling along line 112d. Therefore, the range computed from to the reflection delay for the part of the radar signal traveling along line 112a may be longer than the range derived from the reflection delay for the part of the radar signal traveling along line 112d. Therefore, the cross 113a is at a range (or range bin or range slot) larger than the cross 113d. Because in FIG. 3, the distances of lines 112a and 112g, of lines 112b and 112f, and of lines 112c and 112e, are respectively close to identical, the corresponding crosses 113a and 113g, 113b and 113f, and 113c and 113e in FIG. 4 are located at a similar range, respectively. Due to the movement of the vehicle 200 in direction D, the reflections returning along lines 112 are detected with a phase and/or frequency shift different to each other. Therefore, a reflection along line 112a from a part of an obstacle 310 moving toward the device 200 results in a range rate smaller than a reflection along line 112g from a part of an obstacle 310 moving away from the device 200. The amount of the range rate is different for each of the reflections propagating along lines 112a, 112b, 112c, 112d, 112e, 112f and 112g. Therefore, each of the corresponding crosses 113 is located at a different range rate.

Although only seven lines 112 and seven crosses 113 are depicted in FIGS. 3 and 4, the number thereof is not limited thereto and instead is based on the resolution of the A/D-conversion of the return signal(s) and the resolution of the extraction of the radar data including range data and range rate data. The resolution of the A/D-conversion may be improved by utilizing an A/D-converter with a higher sampling rate and/or higher quantization capacity, e.g. with a 256, 512, 1024 or 2048 bit resolution. As mentioned above, the resolution of the extraction may be increased by increasing the number of bins or slots used in transformation, e.g. the DFT, FFT (e.g. ranging FFT, a range cut-off FFT, a Doppler FFT and/or a digital beam forming FFT).

In FIG. 4, crosses 113 are depicted for parts of the shaded area 311 illustrating information of the radar data related to the obstacle 310. In particular, each cross 113 corresponds to a particular combination of range and range rate (i.e. bin or slot associated to each combination of range and range rate) provided in the radar data. Further, each combination of range and range rate has an associated numerical value corresponding to detection values, amplitude values, reflection amplitudes, energy values or the like. For example, the detection value for the respective bins may be determined by averaging over the number of antennas. Here, the crosses 113 merely illustrate combinations of range and range rate wherein the value associated to the return signal exceeds a certain detection threshold, i.e. a threshold that indicates the presence of an obstacle. On the other hand, although the area 113* in FIG. 4 does not contain a cross, a non-zero or finite detection value is still provided for this combination of range and range rate since detected noise signals may also contribute to such a specific combination of range and range rate (bins). But for the range (or delay) and the range rate (or relative speed) corresponding to area 113*, no obstacle is present at the site indicated by reference sign 112* in FIG. 3. Therefore, no reflection contributes to the return signal (e.g. only noise is detected) for the combination of range and range rate (i.e. a bin or slot) corresponding to area 113*. Thereby, the value at this bin or slot indicates the absence of an obstacle 310 and therefore free space at site 112*. Put differently, any value in the radar data equal to or below a noise-based threshold is indicative of free space, and any such value may therefore be used as a direct determination of free space around the device 100 in vehicle 200.

Therefore, the extraction unit 130 is configured to extract, from the acquired radar data, a specific set of radar data having (detection) values equal to or below the noise-based threshold, i.e. to extract combinations of range data and range rate data (in corresponding bins or slots) having values equal to or below the noise-based threshold. Those detection values below the noise-based threshold correspond to values for which no energy has returned from radar reflections.

Other than the above detection threshold, i.e. a threshold that indicates the presence of a (strong) reflection indicating presence of an obstacle, this noise-based threshold may be determined based on physical properties of the device 100 itself, e.g. based on e.g. a constant false alarm rate (CFAR), a signal to noise ratio (SNR) and/or a peak to average power ratio (PAPR), and may be an antenna specific noise threshold (for example, based on a size, lossy elements, temperature of the antenna). Thereby, combinations of range(s) and range rate(s) based on noise (i.e. having detection values equal to or below the noise-based threshold) are extracted and are used in or stored in the specific set of radar data. For example, as shown in FIG. 4, the range value $r_{ext}$ and the range rate value $\dot{r}_{ext}$ are extracted corresponding to bin/slot area 113* having a detection value equal to or below the noise-based threshold. The extracted specific set of radar data is then provided to the determination unit 140.

For example, a noise level may be determined (measured) for a radar scan, and in some cases for each range bin/index individually. As such, the noise-based threshold may be set based on the measured noise level, which may be noise-based thresholds that are individually set for respective range bin(s). This setting advantageously does not require actual reflections from an object or obstacle and may be continuously re-set by re-measuring the current noise level at the one or more radar antennas before a new radar scan. An appropriate noise-based threshold may thus be dynamically adapted according to the noise level of the device but remains independent on the diverse reflection properties of obstacle.

According to a further embodiment, the noise-based threshold may be a threshold that is set by a machine-learned algorithm which is trained to provide a classification to distinguish between noise values and values corresponding to actual reflections from an object or obstacle. The machine-learned algorithm may be further trained to set such a noise-based threshold for each range bin/index. Such a machine-learned algorithm may be trained based on inputting a plurality of (range, range rate) data having values of both a diverse range of obstacles and free space (i.e. no obstacles). The machine-learned algorithm may further be trained on the basis of radar antenna specific parameters and/or temperature values in order to take different noise sources for the device into account.

The determination unit 140 is configured to determine the free space around (i.e. in one or more detection areas of) the device based on the extracted specific set of radar data. Herein, the determination unit 140 may project extracted range(s) and range-rate(s) corresponding to bins or slots (e.g. the lower and/or upper boundary of the bin or slot, or an average thereof) in the specific set of radar data (i.e. the free space information of the radar data) onto coordinates of an environment surrounding the device 100. In other words, those range and range-rate data bins/slots (which have a detection value equal to or below the noise-based threshold) are used to project the extracted range and range-rate information onto coordinates of an environment surrounding the device 100.

This projection indicates locations surrounding the device 100 (and thereby also of the vehicle 200) of no obstacle, such as the site 112* in FIG. 3, and does not require the presence of an obstacle to provide a reflection (like traditional indirect measuring methods) to indirectly assume a space between a detection/reflection site and the vehicle 200 to be a free space.

In general, such a projection may be performed based on the following expression:

$$\dot{r} = \begin{pmatrix} \cos(\theta) \\ \sin(\theta) \end{pmatrix} \cdot \left[ \begin{pmatrix} v_{obj,x} \\ v_{obj,y} \end{pmatrix} - \begin{pmatrix} v_x \\ v_y \end{pmatrix} \right] \quad (1)$$

to translate the range rate into a corresponding angle $\theta$ when there is an obstacle. In particular, in Eq. (1), $\dot{r}$ is a range rate, $v_x$ and $v_y$ are the x- and y-component of the device motion vector, $v_{obj,x}$ and $v_{obj,y}$ are the x- and y-component of the motion vector of the obstacle 310 (may be assumed to be zero for stationary objects), and $\theta$ is the device's detection angle. Because $\dot{r}$ is based on the range rate data of the radar data, and because $v_x$, $v_y$, $v_{obj,x}$ and $v_{obj,y}$ are known, the angle $\theta$ of the reflection can be found. Since a range r is based on the range data of the radar data, the location of the part of the obstacle 310 resulting the reflection can be determined using polar coordinates.

By now disregarding the x- and y-component of the motion vector of the obstacle 310 in Eq. (1) in case of no obstacle, i.e. by using Eq. (1) with $v_{obj,x}$ and $v_{obj,y}=0$, i.e.

$$\dot{r} = \begin{pmatrix} \cos(\theta) \\ \sin(\theta) \end{pmatrix} \cdot \left[ -\begin{pmatrix} v_x \\ v_y \end{pmatrix} \right] \quad (2)$$

this procedure may now be used with regard to a location (such as 112* in FIG. 3) where no reflection occurs and thus to determine a corresponding free space angle $\theta$ from the extracted range rate. That is, when no reflection occurs at an extracted (range, range rate) value, there is no object or obstacle. It is therefore known specifically that no stationary object is present at a position that corresponds to this extracted (range, range rate) value (otherwise, the stationary object would have created a reflection at that extracted (range, range rate)-value. As such, the extracted (range, range rate)-values can be transformed into corresponding (range, angle)-values for the free space. The (range, angle)-values may subsequently be transformed into corresponding (X, Y)-Cartesian coordinates of free space (with regard to the vehicle).

Instead of classical angle finding using, e.g., digital beam forming FFT (i.e. for a given range and range rate bin that has a detection (i.e. due to a signal returning from an existing object or obstacle), use the antenna dimension and calculate the angle of the detection), the present approach can thus skip classical angle finding and calculate the free space angle θ from the range rate only.

Figure 5:
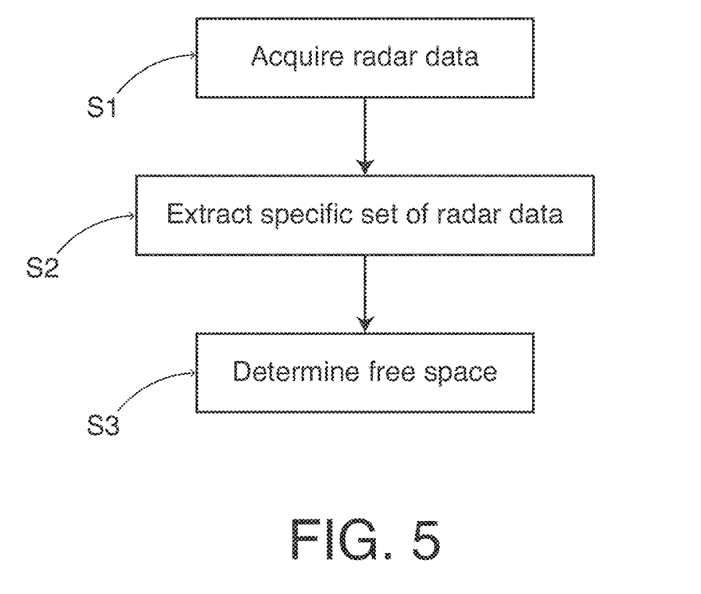
FIG. 5 shows a flow chart of a method according to an embodiment of the present disclosure.
Figure 6:
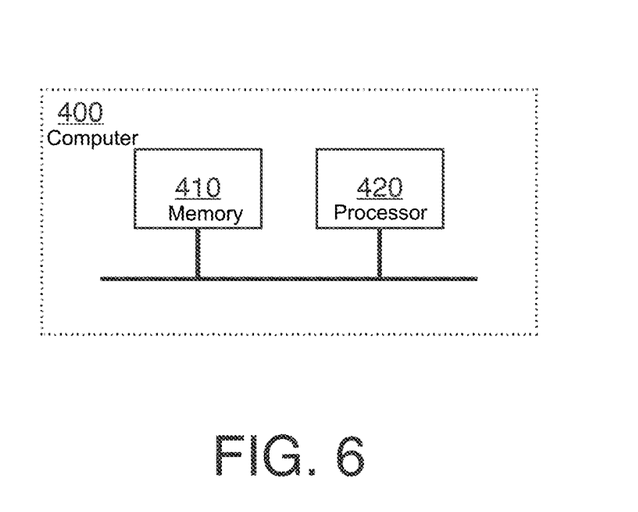
FIG. 6 shows a computer according to an embodiment.

FIG. 5 shows a flow chart according to a method of an embodiment of the present disclosure. The computer-implemented method shown in FIG. 5 is for directly determining a free space surrounding a device 100 and includes three steps. The first step S1 acquires radar data regarding each of one or more radar antennas 110, the acquired radar data including range data and range rate data, as explained above. The second step S2 extracts, from the acquired radar data, a specific set of radar data having detection values equal to or below a noise-based threshold, as explained above. The third step S3 determines a free space around (i.e. in one or more detection areas of) the device 100 based on the extracted specific set of radar data. This method may be stored as a computer program in the memory 410 of a computer 400, which may be a board computer of the vehicle, a computer of a device, radar sensor, radar system and may be executed by a processor 420 of the computer 400 as depicted in FIG. 6.

Figure 7:
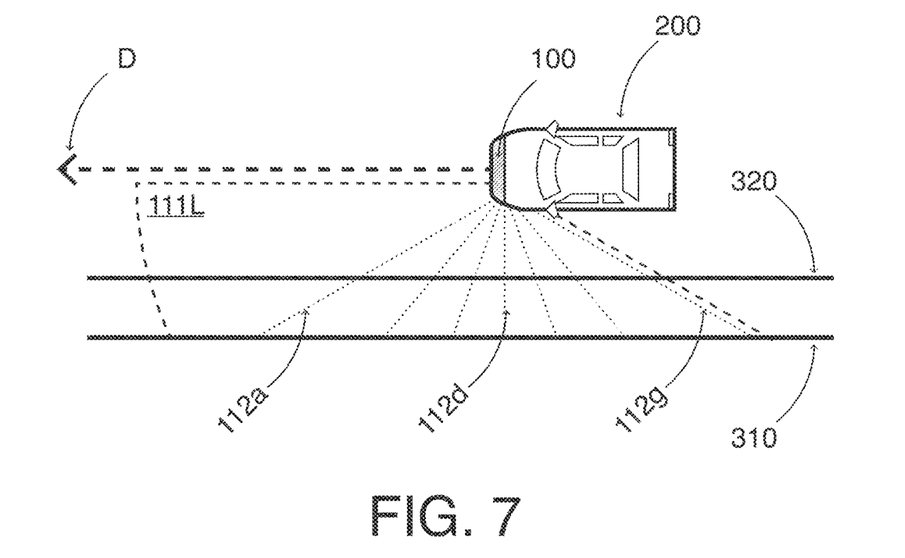
FIG. 7 shows a device according to an embodiment when determining free space surrounding a device.
Figure 8:
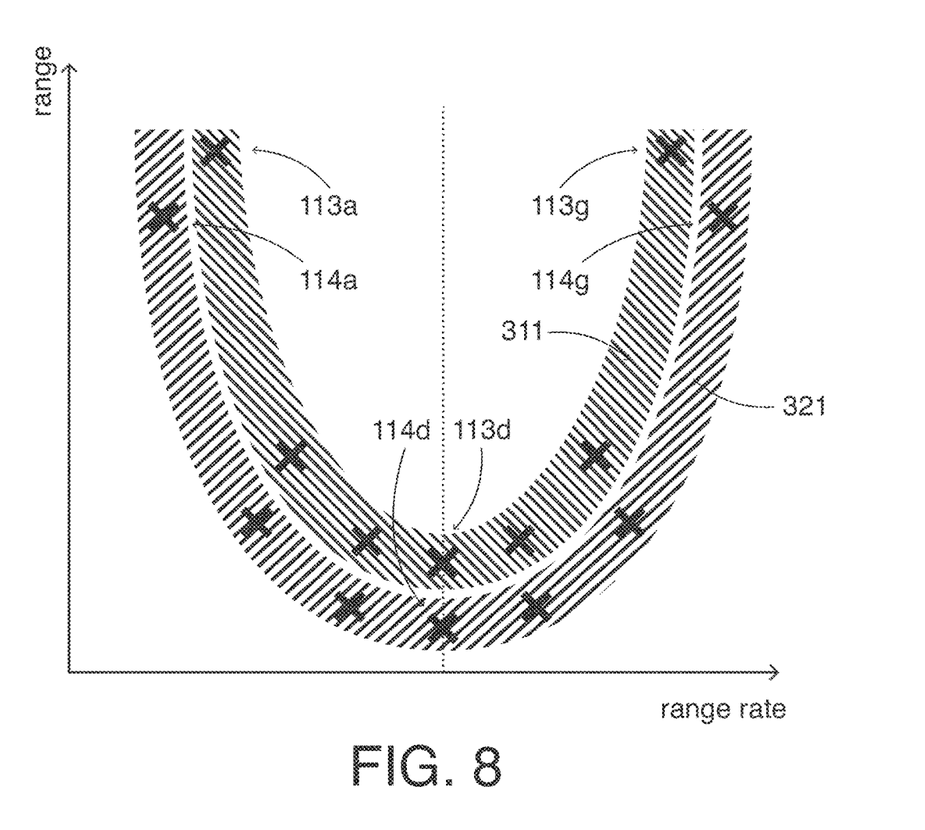
FIG. 8 shows radar data according to an embodiment when determining free space surrounding a device.

Although the preceding example illustrated a single obstacle 310, the device 100 is not limited thereto and may detect a plurality of obstacles. Based on the size and reflective properties of the obstacles, the device 100 may also detect obstacles behind each other. E.g. FIG. 7 shows a vehicle 200 driving in direction D parallel two obstacles 310, 320, e.g. a guardrail alongside a road and a wall. The remainder of FIG. 7 (and of FIG. 8) mutually corresponds to FIG. 3 (and, respectively, to FIG. 4). Therefore, a repetition of the description is omitted. Because some of the radar signal may transmit below the first obstacle 320 (e.g. the guardrail), a reflection from the second obstacle 310 (e.g. the wall) behind the first obstacle 320 may also return to the device 100. Therefore, for each of the exemplary lines 112 in FIG. 7, multiple return signals may be detected by the device 100, resulting in multiple crosses 113, 114 in FIG. 8. In FIG. 8, the crosses 113 at a larger range correspond to an obstacle being further away from the vehicle 100, i.e. the second obstacle 310. In FIG. 8, the crosses 114 at a smaller range correspond to an obstacle being closer to the vehicle 100, i.e. the first obstacle 320. The first obstacle 310 passing by the vehicle 100 at a smaller range reflects a return signal at a frequency shift or a phase shift larger than the second obstacle 310 passing by the vehicle 200 at a larger range. This is due to the relative speed between the vehicle 200 and parts of the two obstacles 310, 320 being different. Therefore, the first shaded area 321 in FIG. 8 corresponding to the first obstacle 320 in FIG. 7 indicates a larger range rate (or relative speed) than the second shaded area 311 in FIG. 8 corresponding to the second obstacle 310 in FIG. 7.

The areas not shaded in FIG. 8 correspond to free space. By applying the noise-based threshold and thereby filtering out the shaded areas 311, 321 the specific set of radar data may be extracted, and free space may be directly determined. The return signal is reflected from a side of the obstacles 310, 320 facing the device 100. Therefore, information regarding depth of the obstacles 310, 320 may not be available. Therefore, the device may also only consider those areas of the radar data as free space, that lie between the device 100 and the closest obstacle, e.g. the first obstacle 320 in FIG. 7 and FIG. 8. Therefore, the entire area above the first shaded area 321 in FIG. 8 may be discarded when projecting the specific set of radar data onto an environment surrounding the device 100 (and thereby also around the vehicle 200).

Figure 9:
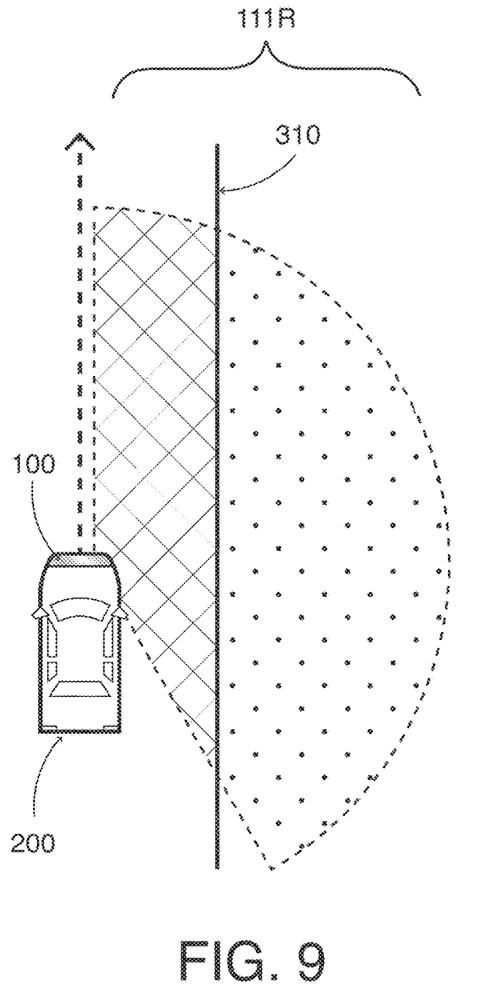
FIG. 9 shows a device according to an embodiment when determining free space surrounding a device.
Figure 10:
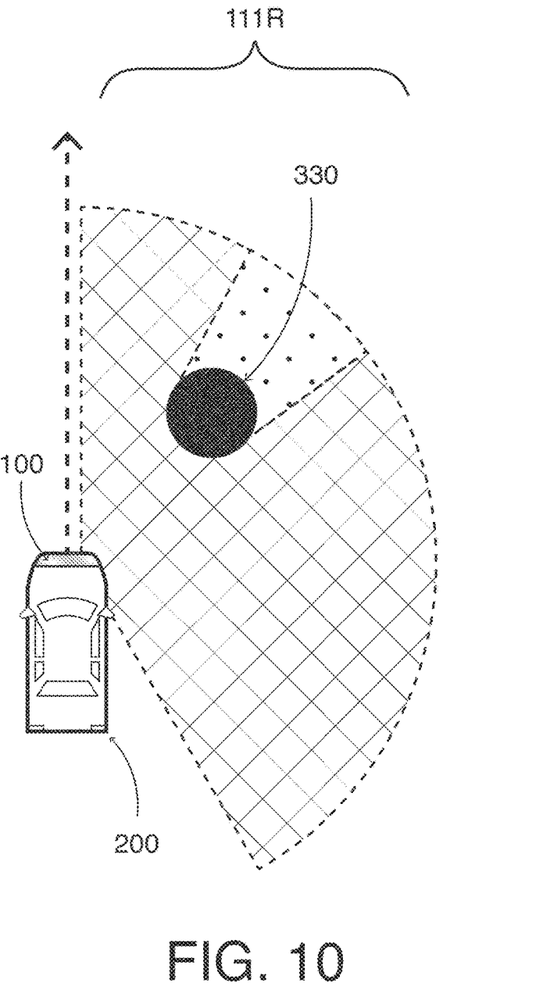
FIG. 10 shows radar data according to an embodiment when determining free space surrounding a device.

FIGS. 9 and 10 depict examples of detecting a wall obstacle 310 and a cylinder obstacle 330 using the device 100 according to the present disclosure. Although the examples shown in FIG. 9 and FIG. 10 only depict a vehicle 200 with the device 100 using a right detection area 111R, other/further detection areas may also be provided, but have been omitted from the drawing for simplicity. It is assumed that free space is detected up to the obstacle closest to the device 100. Therefore, although right detection area 111R would be capable of detecting free space over its entire range (e.g. 150 m), only a region up to the closest obstacle (e.g. the squared region) may be detected as free space. The remaining region of the right detection area 111R (e.g. the dotted region) may not be detected as free space and may be considered as "unknown" or "occluded". Therefore, the region behind the obstacles 310, 330 in FIG. 9 and FIG. 10 may be interpreted as a "shadow". That is, although the space behind obstacle 330 does not reflect radiation energy, and the corresponding range, range-rate combination would also indicate a detection value below the noise-based threshold, this absence of reflected radiation energy for this space may be due the occlusion of this space by the obstacle 330, and this space is therefore considered "unknown".

Figure 11:
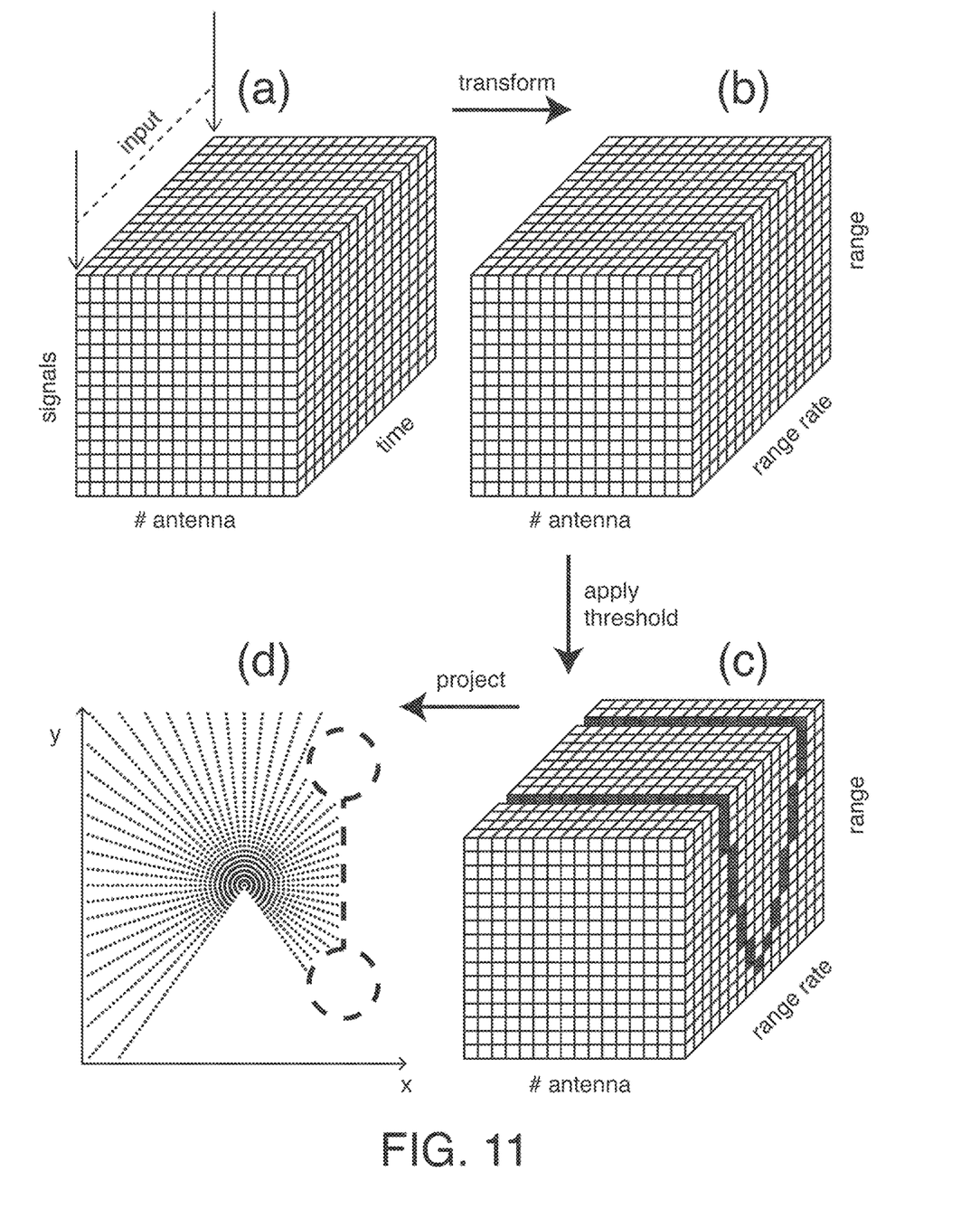
FIG. 11 and FIG. 12 shows a graphical representation of input data, radar data, a specific set of radar data and a determination of free space surrounding a device.

The return signal may be detected by the one or more antennas 110 and may be grouped in a data cube (DC) as shown in FIG. 11(a). The DC may represent a collection of return signal data for a certain number of antennas. More specifically, data may be A/D-converted and may be input into the DC (indicated by the arrows in FIG. 11(a)) for each of the one or more antennas 110. The height of the DC may represent the number of radar signals emitted (e.g. the number of chirp-signals), the width of the DC may represent the number of antennas used by the device 100 (e.g. # antenna), and the depth of the DC may represent the time progression of each signal per antenna (e.g. the number of samples per signal).

This representation of the return signal in FIG. 11(a) may be converted into radar data by applying a DFT or FFT (e.g. ranging FFT, a range cut-off FFT, a Doppler FFT and/or a digital beam forming FFT). Thereby, for each of the one or more antennas 110 a bin or slot for each of range and range rate may generated (see FIG. 11(b)). Each bin or slot contains a value indicating whether the return signal is a combination of a reflection and noise or whether the return signal is only noise. A slice along the height and depth of the cube depicted in FIG. 11(b) is comparable to the diagrams depicted in FIG. 4 and/or FIG. 8. An increased number of antennas, however, may enable further processing to improve the free space detection. By applying the previously described noise-based threshold to the radar data exemplified in FIG. 11(b), the specific set of radar data exemplified in FIG. 11(c) may be generated.

More specifically, if the value of the bin or slot in the cube in FIG. 11(b) is equal to or below the noise-based threshold, the corresponding range and range rate value is stored in the specific set of radar data. For each remaining bin or slot in the specific set of radar data, a point of free space is projected onto a coordinate system representing the surrounding of the device 100. FIG. 11(*d*) illustrates an example of such a projection, wherein the vehicle 200 and/or device 100 are located at coordinate (0, 0) and each dot projected from the specific set of radar data directly indicates free space. The dashed object in FIG. 11(*d*) is merely an example of an obstacle for illustrative purposes but is not actually encoded in the data of the specific set of radar data. Because each of the dots projected on the map in FIG. 11(*d*) has been directly derived from the bins or slots remaining in the specific set of radar data, the device 100 can directly determine which locations surrounding the device 100 (and thereby also around the vehicle 200) are "free". E.g. the device 100 need not first detect an obstacle and infer any area between the device 100 and the obstacle as free. Thereby, the confidence or certainty of accurately detecting free space is improved.

Put differently the method depicted in FIG. 11 or FIG. 12 may be summarized as follows:
1) The radar data is acquired, e.g. a radar's DC including range data and range rate data (or doppler data) for each antenna.
2) The value (e.g. signal energy or amplitude value) for each bin (e.g. (combination of range and range rate) is determined.
3) The value is compared with the noise-based threshold.
4) For each bin or slot having values below or equal to the noise-based threshold (i.e. being classified as "free"), calculate the angle $\theta$ based on the range rate data.
5) Translate the resulting polar coordinate (range r, angle $\theta$) values into Cartesian coordinates (X, Y) and determine these specific positions to be free space.

Figure 12:
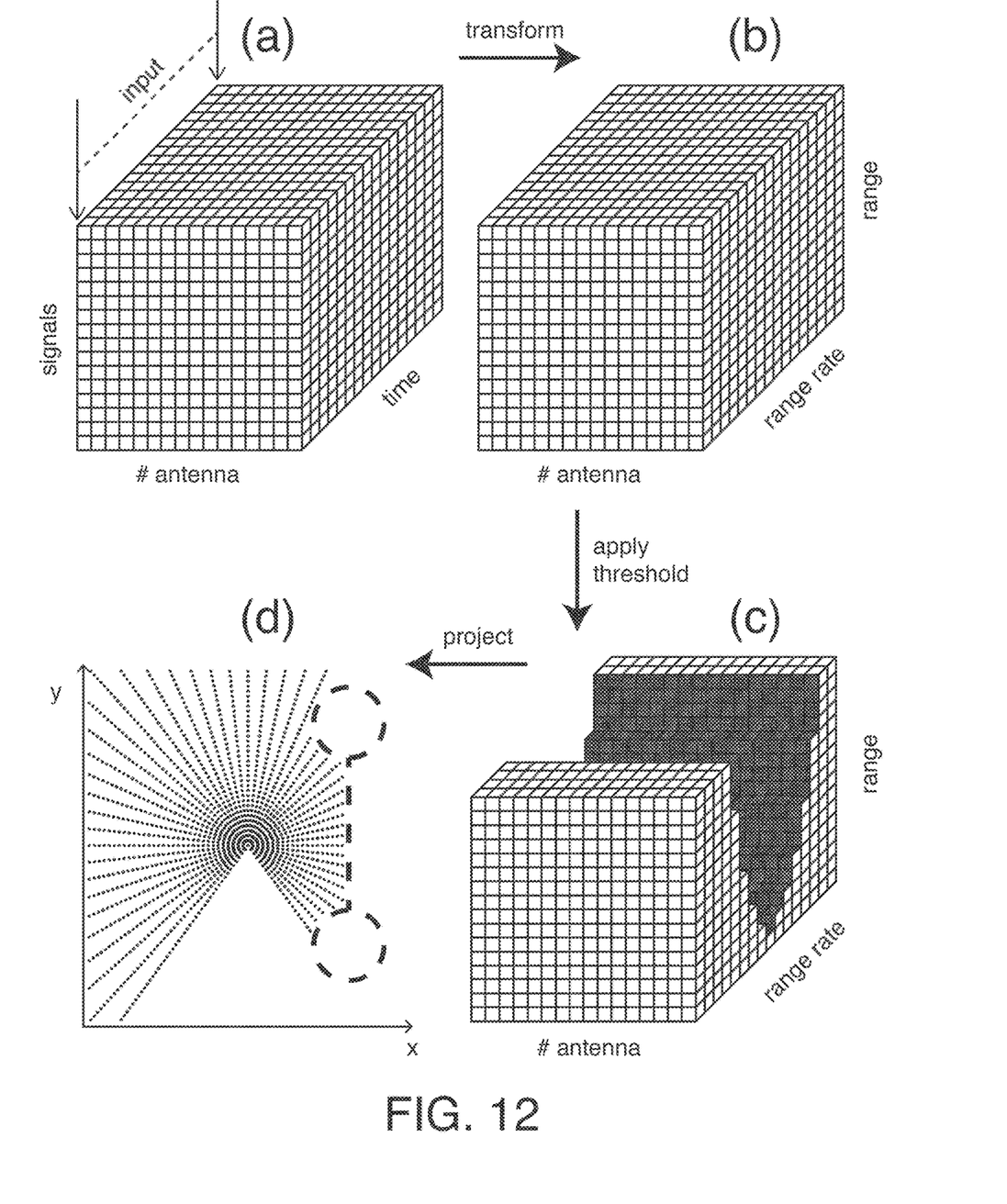

Also, by further reducing the specific set of radar data as shown in FIG. 12(*c*), the computational load for computing and projecting the free space coordinates is reduced. Put differently, in addition filtering out data associated to an obstacle by removing data for which the value exceeds the noise-based threshold, the specific set of radar data may be further filtered by removing, for each range rate, data associated to a range larger than the data for which the value exceeds the noise-based threshold.

It is worth noting, that radar reflections will provide energies above the noise-based not only for the "correct" (range/range rate) bins or slots, but also for neighboring bins, e.g. due to FFT windowing (Point Spread Function). There "incorrect" detections are also called "side lobes", that may be removed e.g. by the iterative adaptive approach (IAA) algorithm or the "CLEAN" algorithm, that may be performed prior to applying the noise-based threshold. This would result in improved determination of free space. Not removing side lobes would lead to a more conservative free space determination/classification, which may be sufficient for most applications and can be mitigated by further processing.

Figure 13:
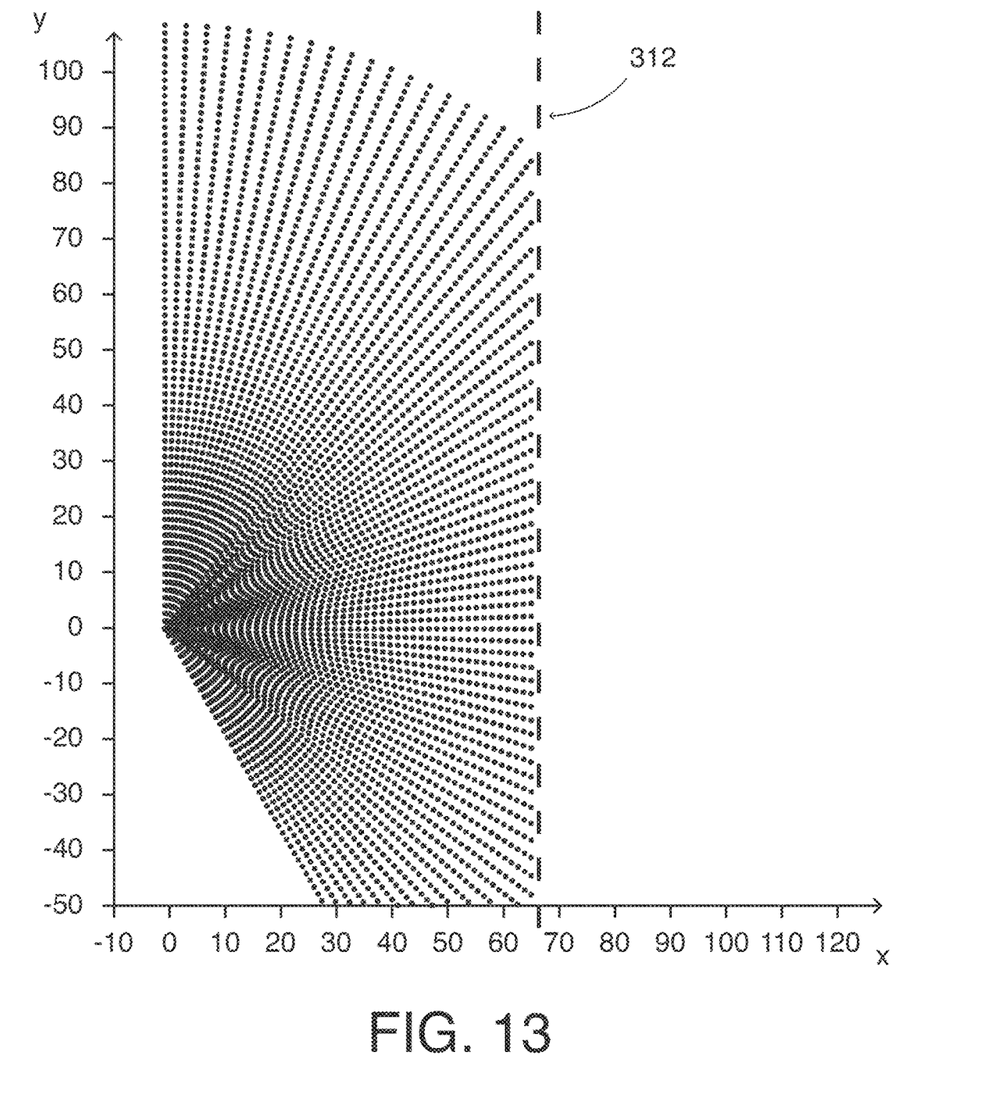
FIG. 13 and FIG. 14 shows a graphical representation of a determination of free space surrounding a device.
Figure 14:
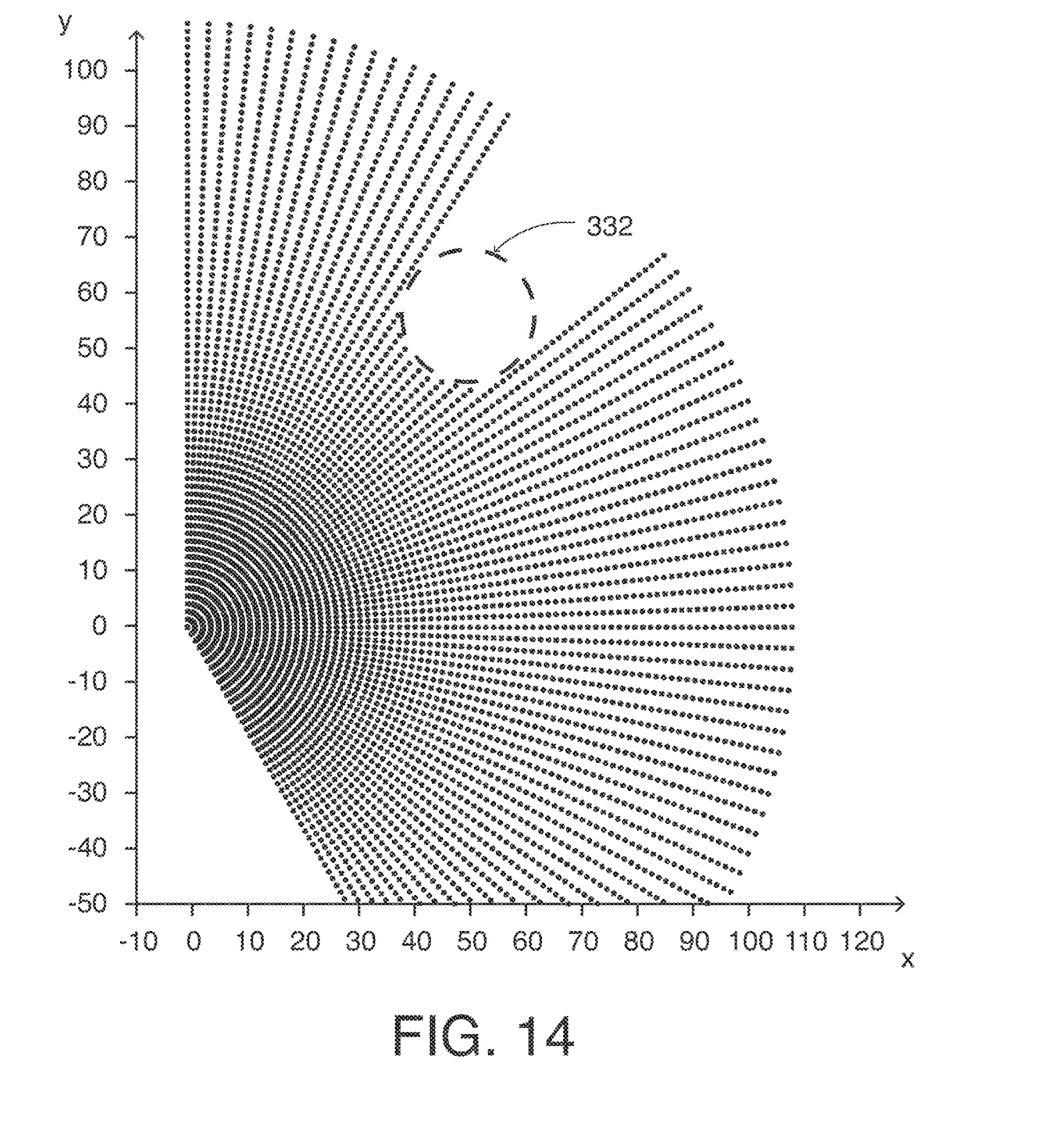

Returning to the examples of FIG. 9 and FIG. 10, free space as shown in FIG. 13 and FIG. 14, respectively, may be determined. More specifically, from the remaining bins or slots of the specific set of radar data, the angle $\theta$ may be computed from the range rate (e.g. based on the expression discussed above). Then the angle $\theta$ may be combined with the range r as a polar coordinate that indicates a point of free space for each of the bins or slots. FIG. 13 and FIG. 14 indicate these points of free space as dots. The obstacles 312 and 332 have only been included for illustrative purposes and are not part of the specific set of radar data.

Put differently, the "holes" (absence of dots) may be caused by detections (reflection points) in the DC, i.e. energy values above the noise-based threshold. That need not mean that this is the real position of the objects or obstacles, due to the assumption of obstacles being stationary. As a result, an angle $\theta$ is computed based on the range rate data of the specific set of radar data and combined with the range data of the specific set of radar data to produce polar coordinates used for determining (S3) coordinates of the free space.

The above described mechanism(s) using a noise-based threshold may result in a binary free space/non-free space decision. In a further embodiment, a method is described for directly determining a free space probability surrounding the device 100. According to this further embodiment, radar data regarding each of one or more radar antennas 110 are acquired (as described above in step S1), whereby the acquired radar data include range data and range rate data. Then a specific set of radar data are extracted from the acquired radar data (as described above in step S2), whereby the specific set of radar data have values equal to or below a noise-based threshold. As described above, the noise-based threshold may be based on a measured noise level of the device 100 or is a noise-based threshold that set by a machine-learned algorithm. Then, when determining a free space around the device 100 based on the extracted specific set of radar data (i.e. for the values equal to or below the noise-based threshold, as described above in step S3), this free space is associated with a high free space probability, for example at a value of more than 95%. The radar data which have not been extracted in step S2 have values above the predetermined threshold. For such values a reduced free space probability may be assigned; for example, a value that exceeds the noise-based threshold by 50% may be associated with a medium free space probability (free space probability around 50%), and a value that exceeds the noise-based threshold by 100% may be associated with low free space probability (free space probability less than 5%). According to a further step in this embodiment, a function may thus be applied that correlates a value-to-threshold difference to a free space probability.

This further embodiment thus defines a method for directly determining a probability of free space surrounding a device, the method including: acquiring radar data regarding each of one or more radar antennas, the acquired radar data including range data and range rate data; associating a probability of free space with the acquired radar data, wherein acquired radar data having values equal to or below a noise-based threshold are associated with a higher probability of free space and acquired radar data having values above the noise-based threshold are associated with a lower probability of free space. The association may be based on a correlation or function between a value-to-threshold difference and the free space probability.

This further embodiment thus also defines a device for directly determining a probability of free space surrounding the device, wherein the device including: an acquisition unit configured to acquire radar data regarding each of one or more radar antennas, the acquired radar data including range data and range rate data; an association unit configured to associate a probability of free space with the acquired radar data, wherein acquired radar data having values equal to or below a noise-based threshold are associated with a higher probability of free space and acquired radar data having values above the noise-based threshold are associated with a lower probability of free space. The association is may be based on a correlation or function between a value-to-threshold difference and the free space probability.

It will be apparent to those skilled in the art that various modifications and variations can be made in the entities and methods of this disclosure as well as in the construction of this disclosure without departing from the scope or spirit of the disclosure.

The disclosure has been described in relation to particular embodiments which are intended in all aspects to be illustrative rather than restrictive. Those skilled in the art will appreciate that many different combinations of hardware, software and/or firmware will be suitable for practicing the present disclosure.

Moreover, other implementations of the disclosure will be apparent to those skilled in the art from consideration of the specification and practice of the disclosure disclosed herein. It is intended that the specification and the examples be considered as exemplary only. To this end, it is to be understood that inventive aspects lie in less than all features of a single foregoing disclosed implementation or configuration. Thus, the true scope and spirit of the disclosure is indicated by the following claims.

What is claimed is:

1. A method, the method comprising:
   acquiring radar data regarding each of one or more radar antennas of a device, the acquired radar data comprising range data and range rate data;
   extracting, from the radar data, a specific set of the radar data having values equal to or below a noise-based threshold; and
   determining, directly from the specific set of the radar data, a free space around the device.

2. The method of claim 1,
   wherein the radar data comprises values, each of the values being a detection value indicating an amplitude of a radar return signal for a combination of the range data and the range rate data, and
   wherein the specific set of the radar data comprises detection values of portions of the radar data that are equal to or below the noise-based threshold.

3. The method of claim 1,
   wherein the noise-based threshold is based on a measured noise level of the device.

4. The method of claim 1,
   wherein the noise-based threshold is based on at least one of: a constant false alarm rate, a signal to noise ratio, or a peak to average power ratio.

5. The method of claim 1,
   wherein the noise-based threshold is a radar antenna specific noise-based threshold.

6. The method of claim 1,
   wherein the noise-based threshold is a threshold set by a machine-learned algorithm.

7. The method of claim 1, wherein determining the free space around the device further comprising:
   computing a free space angle of the device based on the range rate data from the specific set of the radar data combined with the range data from the specific set of the radar data; and
   producing, based on the free space angle, polar coordinates used for determining coordinates of the free space.

8. The method of claim 7, wherein computing the free space angle is based on the expression:

$$\dot{r} = \begin{pmatrix} \cos(\theta) \\ \sin(\theta) \end{pmatrix} \cdot \left[ -\begin{pmatrix} v_x \\ v_y \end{pmatrix} \right],$$

wherein $\dot{r}$ is the range rate, $v_x$ is an x-component of a speed of the device, and $v_y$ is a y-component of the speed of the device.

9. The method of claim 1, wherein determining the free space around the device comprises:
   translating the determined free space relative to a position of the device.

10. The method of claim 1, further comprising:
    removing side lobes from the radar data by applying an IAA algorithm or a CLEAN algorithm to the radar data.

11. The method of claim 1, further comprising:
    removing side lobes from the radar data prior to extracting the specific set of the radar data having values equal to or below the noise-based threshold.

12. A non-transitory computer-readable storage medium comprising instructions that, when executed by a computer of a device, cause the computer to:
    acquire radar data regarding each of one or more radar antennas of the device, the acquired radar data comprising range data and range rate data;
    extract, from the radar data, a specific set of the radar data having values equal to or below a noise-based threshold; and
    determine, directly from the specific set of the radar data, a free space around the device.

13. The non-transitory computer-readable storage medium of claim 12,
    wherein the radar data comprises values, each of the values being a detection value indicating an amplitude of a radar return signal for a combination of the range data and the range rate data, and
    wherein the specific set of the radar data comprises detection values of portions of the radar data that are equal to or below the noise-based threshold.

14. The non-transitory computer-readable storage medium of claim 12, wherein the instructions, when executed, cause the computer to determine the free space surrounding the device comprises by translating the determined free space relative to a position of the device.

15. The non-transitory computer-readable storage medium of claim 12, wherein the instructions, when executed, cause the computer to:
    remove side lobes from the radar data by applying an IAA algorithm or a CLEAN algorithm to the radar data.

16. The non-transitory computer-readable storage medium of claim 15, wherein the instructions, when executed, cause the computer to remove the side lobes from the radar data by removing the side lobes from the radar data prior to extracting the specific set of the radar data having values equal to or below the noise-based threshold.

17. A device comprising a computer having a processor and memory configured to:
    acquire radar data regarding each of one or more radar antennas, the radar data comprising range data and range rate data;
    extract, from the radar data, a specific set of the radar data having values equal to or below a noised-based threshold; and
    directly determine a free space around the device based on the specific set of the radar data.

18. The device of claim 17, further comprising the one or more radar antennas.

19. The device of claim 17,
    wherein the one or more radar antennas are configured to emit a radar signal and detect a return signal, and wherein the processor and memory are further configured to acquire the radar data based on the radar return signal.

20. The device of claim 17, wherein the device is for a vehicle to directly determine free space around the vehicle in response to the processor and memory directly determining the free space around the device.

\* \* \* \* \*